Aug. 30, 1960
S. UMBREIT
2,950,993
OXIDE COATED CATHODES AND METHOD OF MANUFACTURE
Filed April 2, 1956
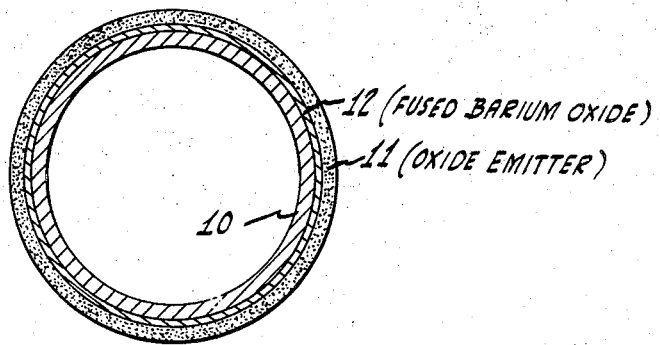
12 (FUSED BARIUM OXIDE)
11 (OXIDE EMITTER)
10
INVENTOR.
STANTON UMBREIT
BY
William A. Zalesak
ATTORNEY 2,950,993
OXIDE COATED CATHODES AND METHOD
OF MANUFACTURE Stanton Umbreit, West Orange, N.J., assignor to Radio Corporation of America, a corporation of Delaware Filed Apr. 2, 1956, Ser. No. 575,599

9 Claims. (Cl. 117—219)

This invention relates to electron emitters and more especially it relates to emitters of the oxide coated cathode kind.

One of the difficulties that has existed in connection with oxide coated cathodes is the tendency for the oxide coating to peel or flake off from the metal core or sleeve to which it is applied. This peeling tendency is greater in accordance with the peripheral size of the core and also in accordance with the thickness or mass of the oxide coating, conditions which are encountered in the case of very large cathodes of the indirectly heated or sleeve construction category.

While it might seem obvious that this peeling tendency could be overcome by using a bonding agent between the core and oxide coating, conventional bonding agents are not entirely suitable because they would tend to destroy the desired electron emission properties of the finished cathode. While various proposals have been made heretofore in the effort to form a bonding coat on the metal core or sleeve, certain objections arise amongst which is the necessity of forming or heat-treating the bonding coat in a vacuum prior to applying the electron emissive oxide coating or coatings. Another objection to the prior methods is that they may require the formation of a hydroxide as an essential element of the bonding coat. Since the coated core must be subjected to the subsequent conventional heat treatments, amongst which is the heating to break down the coating material to the oxide form, it has been found desirable to avoid as much as possible the formation of a hydroxide either in the coating material or in the bonding coat on the core.

I have found that the desired protection against peeling of the oxide coating can be achieved by providing the metal core with a bonding coat consisting mainly of fused or semi-fused barium oxide. Accordingly, one of the principal objects of this invention is to provide an oxide coated cathode having a bonding coat in contact with the metal core and with the superposed oxide coating, which bonding coat consists mainly of barium oxide.

Another object is to provide a bonding coat for bonding an oxide electron emission coating to a nickel or similar metal core and wherein the bonding coat consists mainly of barium oxide and is substantially free from hydroxides, especially barium hydroxide.

Another object is to provide a novel method of processing cathode cores to form thereon a bonding coat consisting mainly of barium oxide and an electron emissive coat consisting of one or more oxides of the alkaline earth metals.

A feature of the invention relates to the method of applying a bonding coat consisting mainly of barium oxide to a metal cathode core, by first applying a layer of barium carbonate to the core and then applying a coating of one or more coprecipitated carbonates of the alkaline earth metals, and then heating the core to a predetermined temperature to convert the first mentioned carbonate layer to a fused layer consisting mainly of barium oxide, and to break down the superposed carbonate coating into emissive oxide, the said fused layer being in direct bonded contact with the metal core and with the emissive oxide coating.

A further feature relates to the novel organization and succession of steps which provide a novel method of bonding a relatively massive coating of alkaline earth metal oxides to a metal core.

Other features and advantages not particularly enumerated will appear as the ensuing description proceeds.

In the single figure of the drawing, there is shown in magnified transverse cross-section, a typical cathode of the so-called indirectly heated kind and embodying the invention.

It will be understood that the invention while it finds its primary utility in so-called sleeve type cathodes, having a relatively thick electron emissive oxide coating, is also useful in cathodes of the filamentary kind and in the smaller conventional sleeve type cathodes wherein the electron emissive coating is relatively thin.

As will be seen in the drawing, the cathode comprises a tubular metal sleeve 10 which for convenience is shown as of cylindrical cross-section, although other cross-sectional shapes may be used. The sleeve or core 10 is preferably, although not necessarily, of nickel or other similar metal or alloy conventionally used in the manufacture of cathode cores or sleeves. The core 10 is provided with a coating 11 of any of the well known electron emitters of the oxide type, such for example as the oxide of barium together with either or both strontium oxide and calcium oxide. In accordance with the invention, the emissive coating is bonded to the core 10 by a relatively thin layer 12 of fused or semi-fused barium oxide. As is well known, the emissive coating 11 can be prepared from either one or more co-precipitated carbonates of the alkaline earth metals such as barium, strontium, calcium. The carbonates are then subjected to the usual heat treatment at approximately 1100° C. to break them down into their respective oxides which constitute the electron emitter.

While the individual particles of the oxide emitter are rather tightly bonded or adherent to each other to form a relatively hard surface, nevertheless that oxide coating tends to peel or flake off from the core 10. This may result in non-uniform emission, development of bright spots, and undesirable deposition of the loose emitter material on other parts of the tube wherein the cathode is subsequently mounted.

While it has been proposed heretofore to provide a bonding layer between the oxide coating and the core, such prior known layer, while it may achieve the desired bonding properties, is limited to certain special kinds of metal cores and usually introduces other difficulties. For example, if the bonding layer 12 is mainly of hydroxide, the presence of the hydroxyl radical tends to the formation of water vapor upon the subsequent heating of the cathode for any purpose. The presence of such water vapor tends to destroy the desirable emissive properties of the cathode. The fused barium oxide bonding coat of the present invention, when made in accordance with the method of the invention, does not contain compounds or radicals that tend in any way to destroy the emissive properties of the oxide coating.

If the core 10 consists for example of nickel which has been cleaned by the usual procedure, it is not necessary to subject its surface to any special additional treatment before applying the bonding and emissive coats as hereinabove described. For example, the nickel sleeve, assuming that its surface has been properly cleaned in accordance with standard practice, has applied thereto either by spraying, brushing, dipping, electro-phoresis or otherwise, a thin coating of barium carbonate. The thickness of this barium carbonate layer is not critical but it should be as thin as is consistent with the required bonding action to the oxide coating. After the barium carbonate has been applied as a coating to the core 10, there is superposed thereon a coating of the conventional alkaline earth metal carbonates which likewise may be applied by spraying, brushing, dipping, electro-phoresis and the like.

As is well known, the carbonates which are to form the oxide emissive coating may be of the co-precipitated kind in the form of double co-precipitated carbonates or triple co-precipitated carbonates, or a mixture of individual carbonates. The coated core can be provided with the usual internal heater element or wire (not shown) and can be mounted within a suitable enclosing bulb or envelope which is then subjected to the standard heat treatment and evacuation techniques, and including the conventional carbonate breakdown processing. The carbonate breakdown temperature should be approximately 1100° C. so as to form the fused barium oxide bonding coat and to break down the superposed carbonate or carbonates into the emissive oxide coat. If it is found that the barium oxide of the bonding coat 12 is too readily fusible, it is possible to mix with the barium carbonate which is to form the bonding coat 12, minor amounts of strontium carbonate which tends to reduce the fusibility of the bonding coat.

It will be understood, of course, that during the breakdown of the carbonates in coating 11, a small percentage of the broken down emission carbonate or oxide, for example strontium oxide, may migrate into the bonding layer 12. Such, however, will not deleteriously affect the bonding properties of that layer since the presence of strontium oxide reduces the fusibility only slightly of the layer 12, as above noted.

If it is found necessary, the barium carbonate coating which eventually forms the bonding layer 12 as barium oxide, instead of being applied in a single pass, may be applied in a series of passes to increase the thickness of the layer 12 so as to correlate it with the thickness of the emissive coating 11. However, the bonding coating 12 should be as thin as possible consistent with its desired bonding properties and may have a thickness which is only a small fraction of the thickness of the coating 11. Merely by way of illustration, the core 10 may be of nickel stock having a wall thickness of approximately 0.05 millimeter, the coating 11 may have a thickness of 0.10 millimeter, and the bonding coat 12 may have a thickness of approximately 0.01 millimeter.

The following are typical examples of procedures that may be used. Approximately 250 grams of substantially pure barium carbonate in powdered form and of the desired fineness can be added to a liquid vehicle such as approximately 250 cubic centimeters of solvent, such as butyl acetate, which also includes a small percentage of an organic binder, such for example as nitrocellulose. This batch is preferably thoroughly mixed, for example by ball milling. The liquid batch can then be sprayed in the conventional manner in the open air upon the external surface of the metal sleeve or core 10. As is the usual practice, a large number of such sleeves can be held in a suitable frame so that they can all be sprayed at the same time. After the barium carbonate coating has been dried at room temperature, for example, it has sprayed thereon a predetermined quantity of the previously co-precipitated alkaline earth metal carbonates, which have been prepared in the conventional manner. The thickness of this latter coating will be determined by the use for which the cathode is designed.

While in the foregoing, reference has been made to the use of barium carbonate as the source material for forming the barium oxide bonding coat 12, it will be understood that other similar barium salts may be employed providing they are free from hydrogen or hydroxy radicals, and do not form water in the course of decomposition.

Various changes and modifications may be made in the combination of materials and the procedure hereinabove described consonant with the scope of the appended claims.

What is claimed is:

1. An electron emitter comprising a conductive core having a surface carrying an outer coating of electron emissive material, including barium oxide and a bonding layer consisting essentially of fused barium oxide and substantially free from hydroxides between the said coating and said surface of said core, the said barium oxide being integrally bonded to the said surface and to the said emissive coating, said bonding layer having a thickness for permanently bonding said outer coating to said core.

2. An electron emissive cathode comprising a metallic conductive core, an outer surface layer of electron emissive alkaline earth metal oxides including barium oxide carried by said core, and an intermediate layer between said outer surface and said core for permanently bonding said outer emissive surface layer to said core, said intermediate layer consisting essentially of fused barium oxide and being substantially free from hydroxides.

3. An electron emissive cathode comprising a metallic conductive core, an external surface layer of electron emissive alkaline earth metal oxide consisting at least of barium oxide carried by said core, and an intermediate layer substantially free from hydroxides and consisting essentially of barium oxide which is in at least a partially fused condition and permanently bonding said emissive layer to said core.

4. An electron emissive cathode according to claim 3, in which said barium oxide intermediate layer has a thickness which is about one-tenth of the thickness of said emissive layer.

5. The method of attaching an electron emissive layer to a conductive core which comprises first applying in a form of a suspension to said core substantially pure and hydroxide free barium carbonate to form a first coating on said core, and then applying to said first coating a further coating of a material consisting of barium carbonate, strontium carbonate and calcium carbonate for forming an electron emissive oxide, and heating the doubly coated core to convert said substantially pure barium carbonate into barium oxide and to form at least a partially fused barium oxide layer in direct surface contact with said core and with said material.

6. The method of attaching an electron emissive coating to a conductive core which comprises applying to said core in a form of a suspension a coating consisting essentially of a barium salt which is free from hydrogen, applying to the barium salt a coating of a material including at least barium carbonate and strontium carbonate in particle form which forms an electron emissive oxide, heating the coated core to convert the barium salt into barium oxide in at least a partially fused barium oxide condition to form a fused bond between the said core and said material and to convert said barium carbonate and strontium carbonate to the oxide form while preserving the said particles thereof from bodily fusion.

7. The method according to claim 6 in which the said material comprises at least two co-precipitated carbonates of alkaline earth metal.

8. The method of making an oxide coated cathode which comprises, mixing substantially pure barium carbonate substantially free from hydroxides, with a liquid containing a volatile solvent and binder, coating a metal core with said mixture to form a thin bonding layer thereon, preparing a separate batch of two or more co-precipitated alkaline earth metal carbonates in a liquid vehicle containing a binder, applying the last-mentioned carbonates as a second coating on said bonding layer, and heating the coated core in a vacuum to a predetermined temperature sufficient to convert the barium carbonate in the bonding layer to at least partially fused barium oxide and to break down the said second coating to form an emissive oxide layer substantially free from fusion and which is integrally bonded to said bonding layer.

9. The method according to claim 8, in which the said heating of the coated core is done at a temperature of approximately 1100° C.

References Cited in the file of this patent

UNITED STATES PATENTS

| | | |
|---|---|---|
| 1,650,232 | Pickard | Nov. 22, 1927 |
| 2,041,802 | Wilson et al. | May 26, 1936 |
| 2,238,595 | McNall | Apr. 15, 1941 |
| 2,249,598 | Borchardt et al. | July 15, 1941 |
| 2,476,590 | Evans | July 19, 1949 |
| 2,733,173 | Francis | Jan. 31, 1956 |
| 2,792,273 | Beggs | May 14, 1957 |
| 2,843,517 | Kerstetter et al. | July 15, 1958 |

FOREIGN PATENTS

| | | |
|---|---|---|
| 707,241 | Great Britain | Apr. 14, 1954 |